United States Patent [19]

Mackay et al.

[11] 4,065,579

[45] Dec. 27, 1977

[54] LONG-LASTING FLAVORED CHEWING GUM INCLUDING CHALK-CONTAINING GUM BASE

[75] Inventors: Donald A. M. Mackay, Pleasantville, NY; Daniel Schoenholz, Basking Ridge, N.J.

[73] Assignee: Life Savers, Inc., New York, N.Y.

[21] Appl. No.: 731,162

[22] Filed: Oct. 12, 1976

[51] Int. Cl.$^2$ ............................................... A23G 3/30
[52] U.S. Cl. ........................................ 426/3; 426/548; 426/804
[58] Field of Search ......................................... 426/3-6

[56] References Cited

U.S. PATENT DOCUMENTS

| | | | |
|---|---|---|---|
| 3,666,492 | 5/1972 | Teng | 426/3 |
| 3,681,087 | 8/1972 | Johnson | 426/3 |
| 3,795,744 | 3/1974 | Ogawa et al. | 426/3 |

*Primary Examiner*—Jeanette M. Hunter
*Attorney, Agent, or Firm*—Lawrence S. Levinson; Merle J. Smith; Burton Rodney

[57] ABSTRACT

A chewing gum is provided which includes a coated chalk-containing base and contains a poorly water-soluble sweetening agent, such as the free acid form of saccharin, and/or food acid, the sweetening agent and/or food acid being coated with an edible coating agent. The coating agent inhibits reaction of the free acid or food acid with chalk ($CaCO_3$) and thus inhibits formation of soluble salts which are quickly solubilized in the mouth.

15 Claims, No Drawings

LONG-LASTING FLAVORED CHEWING GUM INCLUDING CHALK-CONTAINING GUM BASE

FIELD OF THE INVENTION

The present invention relates to a chalk-containing gum base wherein particles of chalk are coated with an edible coating agent, to a chewing gum containing such gum base, and to a chewing gum containing a chalk-containing gum base and a sweetening agent and/or food acid coated with an edible coating agent so as to inhibit or prevent reaction of the sweetening agent or food acid with the chalk in the gum base.

BACKGROUND OF THE INVENTION

Conventional chewing gum generally includes gum base, water-soluble flavoring and water-soluble sweenteners, for example, various sugars and/or artificial sweeteners such as sodium or calcium saccharin. Such gum initially provides a desirable strong sweet taste which declines rapidly during the first three to five minutes of chewing to a very slight perceptible level of sweetness and flavor. The result is that after about five minutes of chewing all that remains in the mouth is an essentially tasteless wad which provides little in the way of flavor, aroma or sweetness. Furthermore, chewing gum which depends upon the water-soluble forms of saccharin for its sweetness exhibits an undesirably strong sweet taste initially accompanied by an objectionable medicinal and/or bitter after-taste. Accordingly, there clearly is a need and long felt want for a chewing gum which possesses long-lasting flavor without the undesirable medicinal and bitter after-taste which normally accompanies chewing of gum sweetened by the soluble saccharin salts.

It has been found that the sweetness and flavor of non-sour flavored (mint), fruit-flavored or sour chewing gum can be prolonged by incorporating a solid poorly extractable or poorly water-soluble sweetener in particulate form, such as a poorly water-soluble form of saccharin, and optionally, where sour or fruit flavors are desired, a poorly extractable or poorly water-soluble food acid in particulate form, in a chalk-free gum base during the preparation of the gum. The particulate poorly extractable or poorly water-soluble sweetener and food acid are substantially retained in the chalk-free gum base and during chewing undergo slow and controlled release into the saliva.

It is important in the above chewing gum that the free saccharin acid form of the poorly extractable, poorly water-soluble saccharin employed in one embodiment remain in the gum base for as long as possible without being solubilized therefrom. However, it has been found that where conventional gum base compositions, that is, those gum bases containing calcium carbonate (chalk) as a filler and/or texturizing agent are employed in forming the chewing gum, the chewing gum tends to lose its sweetness retention properties after a few weeks of shelf storage at room temperature. Apparently, during storage, the free acid form of saccharin reacts with the chalk in the gum base to form the calcium saccharin salt which is solubilized from the chewing gum substantially faster than the free acid form of saccharin. Thus, conversion of the free saccharin acid to a soluble salt such as the calcium or sodium salts of saccharin should be avoided where possible.

DETAILED DESCRIPTION OF THE INVENTION

In accordance with the present invention, the above-described difficulty is overcome by providing a gum base composition which contains particulate or powdered chalk ($CaCO_3$) which is protected or coated with an edible coating agent. The coated chalk-containing chewing gum base of the invention having particles of free saccharin acid (or other poorly water soluble sweetener in the form of an acid) dispersed therein and when employed in conjunction with the soluble phase as described herein will provide a chewing gum having long shelf life and which will retain its sweetness for substantially longer periods than chewing gum heretofore known.

Further in accordance with the present invention, a chewing gum is provided which contains a chalk-containing gum base and a poorly water-soluble sweetening agent in particulate form coated with an edible coating agent so as to protect the sweetening agent from reaction with the chalk in the gum base.

A further feature of the present invention comprises a flavored chewing gum including a particulate food acid and optionally a particulate or poorly extractable or poorly water-soluble acid sweetener, incorporated in the gum base, and optionally an easily extractable, for example, water-soluble sweetener, such as a sugar and/or polyol, such as sorbitol, a water-soluble saccharin salt or other synthetic water-soluble sweetener, water-soluble food acid (where desired) and a flavoring. In this embodiment, the chalk in the gum base and/or the acid sweetener and/or the food acid will be coated with a coating agent as described herein.

Sour (fruit) flavored chewing gums normally include relatively expensive chalk-free bases to avoid reaction of fruit acids with chalk. Accordingly, the present invention provides for a sour or fruit gum which may contain chalk containing bases and still have good shelf life, the chalk and/or fruit acid being coated to prevent reaction as described herein.

The terms "coat", "coated" and "coating" as employed herein are intended to refer to the application of an edible material to particles of poorly water-soluble sweeteners, food acids or chalk by coating techniques, encapsulation or any other conventional technique of physically combining a coating agent with the sweetener, food acids or chalk.

Conventional chewing gum provides initially a very strong sweet taste which declines very rapidly in the firt 3 or 4 minutes of chewing to only a slight level of sweetness and then declines steadily until stabilizing at a very low sweetness level at about 10 to about 12 minutes of chewing. The chewing gum of the present invention, on the other hand, which contains the coated sweetener or coated chalk, provides a chewing gum whose sweetness corresponds to that of conventional gum for the first 3 minutes but, thereafter, begins to drop more slowly and stabilizes after about 5 minutes of chewing at a desirable sweetness level. This sweetness level remains essentially stable for 30 minutes or more of chewing. In the chewing gum of the invention, during the first few minutes of chewing, the perceived sweetness is due only to sugars or sugar alcohols, or soluble artificial sweeteners present in the chewing gum. Thereafter, the poorly water-soluble sweetener is released, flavor is stabilized and the sweet taste persists for extended periods of chewing of up to 30 minutes or more.

In view of the above, it will be appreciated that by coating the sweetener or coating the chalk in accordance with the invention, shelf life is improved and the initial sweetness impact of the sweetener is reduced or delayed. Thus, the coated sweetener may be used in sugar or sugar alcohol or artificial soluble sweetener-containing chewing gums where a second burst of sweetness from the coated poorly water-soluble sweetener is desired to produce a long-lasting flavored gum which will not have the overpowering sweetness which would normally result where uncoated sweeteners and sugar are employed together.

In forming the coated sweetener, coated food acid, or coated chalk, the sweetener, food acid or chalk will be employed in a weight ratio to the coating material of within the range of from about 3:1 to about 100:1, and preferably from about 5:1 to about 25:1, depending upon the type of coating material employed.

Examples of edible coating materials suitable for use herein include materials which are substantially insoluble in the gum base and are poorly water-soluble, such as, hydrocolloids, for example, alcohol-soluble cellulose derivatives such as ethyl cellulose and hydroxy-propyl cellulose; a water soluble material which may be plasticized after it coats the sweetener or chalk, such as sodium alginate, pectin, gelatin, carrageenin, arabic acid, agar and karaya; and water-insoluble waxes, such as carnauba wax, beeswax and microcrystalline waxes, polyvinyl alcohol, low molecular weight polyethylene, polyvinyl propionate as disclosed in U.S. Pat. No. 3,826,847. Preferred are ethyl cellulose, sodium alginate, and paraffin wax.

The sweetener, food acid or chalk may be coated with any of the above coating materials employing conventional coating or encapsulation technology. For example, where the coating material employed is water-insoluble or poorly water-soluble, the coating is first dissolved in a suitable organic solvent to form a solution containing 1 to 10% coating material. The sweetener, food acid or chalk is ground (particle size of about 250μ or lower) and incorporated in the above solution in an amount of from about 1 to about 10% sweetener or chalk. The above mixture is mixed and then poured into a resin kettle and the solvent is evaporated under vacuum at low temperature. Alternatively, the sweetener, food acid or chalk and coating material may be spray dried at lower temperature. The solids comprising coated sweetener or chalk are removed, and then ground and/or classified to a suitable particle size for use in chewing gum.

It will also be appreciated that the coated sweetener, coated food acid, or chalk of the invention may be employed in chewing gum which includes sugar and/or other uncoated artificial water-soluble or poorly water-soluble sweeteners such as free saccharin, saccharin salts, cyclamates, glycyrrhizin, dihydrochalcones, L-aspartyl-L-phenylalanine methyl ester and the like, as well as other flavors and other conventional chewing gum ingredients.

The chalk-containing gum base will be present in an amount ranging from about 10 to about 50%, and preferably from about 15 to 30% by weight of the chewing gum composition.

In general, the gum base is prepared by heating and blending various ingredients, such as, natural gums, synthetic resins, waxes, plasticizers, etc., in a manner well known in the art. Typical examples of the ingredients found in a chewing gum base are masticatory substances of synthetic origin such as styrene-butadiene copolymer, isobutylene-isoprene copolymer, polyisobutylene, polyethylene, petroleum wax, polyvinyl acetate, as well as masticatory substances of natural origin such as rubber latex solids, chicle, crown gum, nispero, rosidinha, jelutong, pendare, perillo, niger gutta, tunu, etc. The elastomer or masticatory substance will be employed in an amount within the range of about 5 to about 15%, preferably from about 8 to about 12%, and optimally from about 9 to about 11% by weight of gum base composition.

In addition, the gum base will preferably contain a solvent for the elastomer which should have minimal tackifying properties and will preferably comprise hydrogenated ester gum, that is, glycerol ester of hydrogenated rosin and/or dimerized ester gum. However, other solvents may be employed such as pentaerythritol ester gum, polymerized ester gum, and ester gum. The solvent will be employed in an amount ranging from about 10 to about 40%, preferably from about 18 to about 30%, and optimally from about 20 to about 25% by weight of the gum base.

The gum base may also include a hydrophilic-type detackifier which will sorb saliva and become slippery and is incompatible with the elastomer and solvent for the elastomer. Examples of such materials suitable for use herein will include vinyl polymers having a molecular weight within the range of from about 2000 to about 10,000 or more, such as polyvinyl acetate, polyvinyl butyl ether, copolymers of vinyl esters and vinyl ethers. It will be appreciated that the polyvinyl acetate or any other material which may be present in the gum base will not serve the function of the coating agent for the chalk or the sweetener and that such coating agent is separately applied to the chalk or sweetener.

The hydrophilic-type detackifier will be employed in an amount within the range of from about 20 to about 40% by weight of the gum base, preferably from about 25 to about 35%, and optimally from about 28 to about 32% by weight of the gum base.

The gum base may also include hard waxes which serve as lubricants and should have a melting point of above about 65° C and preferably above about 75° C. Examples of such hard waxes include candelilla wax, paraffin wax, carnauba wax, ozokerite, oricury, microcrystalline wax, and the like. The hard waxes will be employed in an amount within the range of from about 0 to about 50% by weight of the gum base, preferably from about 17 to about 40%, and optimally from about 20 to 30% by weight. The preferred hard waxes are candelilla wax and paraffin wax employed in combination so that from 2 to about 8% (based on the weight of the gum base) of the candelilla is employed with from about 15 to about 30% (based on the weight of the gum base) of the paraffin wax. The waxes are found to reduce the tackiness of the final gum composition without significantly reducing cohesivity thereof.

The gum base may also include a softening agent and lubricant combination which may comprise one or more hydrogenated vegetable or animal fats having a high melting point, that is, above about 22° C, and preferably above about 50° C; such softening agent and/or lubricant may be employed in amounts ranging from about 0 to about 15% by weight of the gum base, preferably from about 4 to about 12%, and optimally from about 5 to about 10%.

The gum base will also include an emulsifier to impart hydrophilic properties to the gum base so that saliva will be absorbed thereby making the gum base slippery; the emulsifier will be employed in amounts ranging from about 2 to about 12% by weight of the gum base, preferably from about 3 to about 8%, and optimally from about 5 to about 7%. Examples of such emulsifiers include glyceryl monostearate, phosphatides, such as lecithin and cephalin, Tweens, Spans and mixtures thereof.

In addition, the gum base may include colorants such as titanium dioxide, plasticizers, such as lanolin, stearic acid, sodium stearate, potassium stearate and the like, antioxidants, in an amount up to 2000 ppm of the gum base, such as butylated hydroxyanisole, butylated hydroxytoluene, and propyl gallate.

The gum base will contain particles of chalk ($CaCO_3$) as a bulking agent and texturizer in amounts ranging from about 0 to about 50%, and preferably from about 5 to about 25% by weight of the gum base.

The gum base is prepared by heating and/or blending the various ingredients as mentioned above in a manner well known in the art.

The water-insoluble gum base may consist of any of the various bases disclosed for example in U.S. Pat. Nos. 3,052,552 and 2,197,719. Typical ingredients included in gum base compositions are the following:

| Base I | Parts by Weight |
|---|---|
| Ester gum | 88 |
| Rubber latex solids | 10 |
| Lecithin | 2 |
| Chalk | — |
| Base II | |
| Chicle | 30 |
| Jelutong | 60 |
| Gutta soh | 8.5 |
| Lecithin | 2 |
| Chalk | — |
| Base III | |
| Partially oxidized chicle | 98 |
| Lecithin | 2 |
| Chalk | — |
| Base IV | |
| Jelutong (dry) | 80 |
| Gutta siak | 18 |
| Lecithin | 2 |
| Chalk | — |

The chewing gum of the invention may also include flavoring, such as sour or fruit flavoring or non-acid or mint flavoring in an amount ranging from about 0.3 to about 2.0% by weight, and preferably from about 0.5 to about 1.2% by weight of the final gum product. The flavoring may comprise oils derived from plants, leaves, flowers, fruit, etc. Representative flavor oils of this type include citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the chewing gum of the invention with or without conventional preservatives.

The method for forming a long-lasting flavored gum includes the steps of admixing melted gum base (which may contain particles of chalk coated with the coating agent) with a plasticizer such as a syrupy substance such as corn syrup or a modified starch syrup or sorbitol syrups, at a temperature ranging from about 180° to about 210° F, to form a base-syrup mix, (where desired) adding flavor oil to the mix, and during the first five minutes of mixing, admixing the base-syrup with a particulate poorly extractable or poorly water-soluble sweetener, preferably poorly water-soluble free saccharin acid (which may be coated with coating agent), and optionally a food acid (which may be coated with coating agent), at a temperature below 250° F so as to inhibit formation of soluble salts, to form a continuous gum mass having the particles of sweetener and food acid (where present) intimately dispersed therein, and thereafter admixing the above mix with one or more easily extractable water-soluble sweeteners, and easily extractable water-soluble flavors. The resulting mix is then formed into sticks or tablets of chewing gum employing conventional techniques.

By following the above procedure the particulate sweetener and particulate food acid (where present) will be incorporated and retained in the gum base and will undergo controlled release in the mouth for periods of up to 30 to 60 minutes or more to provide concentrations of the sweetener below the bitter threshold thereof, but in sufficient amounts to provide a pleasant sweet taste, as well as a pleasant sour taste to balance the sweet taste of the sweetener (where the food acid is present). This can be accomplished because of the very small particle size of the particulate poorly water-soluble sweetener and food acid (where present) employed herein. Furthermore, reaction of the chalk with the sweetener acid or poorly soluble food acid to form soluble compounds will be inhibited thereby contributing to increased shelf life of the chewing gum.

The particulate slowly or poorly extractable sweeteners suitable for use herein may comprise sweeteners, including poorly extractable forms such as poorly water-soluble forms, such as the free acid form of saccharin, glycyrrhizic acid, free cyclamic acid and the like, or mixtures of any two or more of the above, with the free acid form of saccharin being preferred.

The particulate slowly or poorly extractable or poorly water-soluble sweetener will be present in the chewing gum in amounts ranging from about 0.02 to about 2.5% by weight of the chewing gum, and preferably from about 0.1% to about 1.0% by weight of the chewing gum. Moreover, it is essential that the sweetener be in particulate form so that it may be readily mixed into the melted gum base and retained in the finished gum base to undergo controlled release in the mouth. Accordingly, the particulate sweetener will preferably have a particle size below about 150 microns (0.15 mm) and preferably below about 100 microns (0.1 mm). Use of free saccharin acid of the above-mentioned average particle size in the concentration range given above, will also reduce the bitter aftertaste associated with such saccharin. Furthermore, in a preferred embodiment, the free saccharin acid employed will be prepared by the so-called "Maumee" process so that it will be substantially free of o-toluene sulfonamide (which has been found to add to the bitter taste of free saccharin acid).

The particulate food acid component (where present) will comprise fumaric, tartaric, citric, malic, ascorbic, adipic or succinic acids in particulate form having a particle size of below about 100 microns so that it may be easily dispersed in the gum base together with the particulate slowly or poorly extractable or poorly water-soluble sweetener and be retained therein to undergo controlled release in the mouth. Generally, the chewing gum of the invention will contain from about 0.5% to about 3.5% and preferably from about 1.5% to about 2.5% of particulate food acid by weight of the chewing gum.

Where liquid flavors are employed, they may be added to the gum base-syrup mix as in the case of the free saccharin acid, that is, during the first five minutes of mixing, before a continuous mass of the gum base has been formed. Furthermore, after the sugar has been mixed in with the gum base, any of the above flavors, in the form of a spray dried flavor with or without citric acid may be added.

In order to provide an initial taste or sensation of sourness, the chewing gum of the invention may also preferably contain an easily extractable food acid such as a water-soluble food acid, such as citric acid, tartaric acid, ascorbic acid or malic acid, in uncoated form, in an amount ranging from about 0.3 to about 2.0% by weight, and preferably from about 0.5 to about 1.2% by weight of the final gum product.

The chewing gum of the invention will optionally, and preferably, include an easily extractable or water-soluble sweetener in addition to the poorly extractable sweetener; the easily extractable sweetener being present in an amount ranging from about 90 to about 0.05%, preferably from about 85 to about 70% by weight of the final product to provide an initial burst of sweetness. Such water-soluble sweeteners may include one or more sugars, sugar alcohols, or sugar containing material, for example, monosaccharides, disaccharides and polysaccharides, some examples of which follow:

A. Monosaccharides of 5 or 6 carbon atoms — arabinose, xylose, ribose, glucose, mannose, galactose, fructose, dextrose, or sorbose or mixtures of two or more of the foregoing monosaccharides.

B. Disaccharides — sucrose such as cane or beet sugar, lactose, maltose or cellobiose; and C. Polysaccharides — partially hydrolyzed starch, dextrin or corn syrup solids.

The sugar alcohols include sorbitol, xylitol, maltitol or mannitol.

In a preferred embodiment, sorbitol will be included in combination with sugar as the water-soluble sweetener. In such case, the sorbitol will be present in an amount within the range of from about 2 to about 20% by weight of the chewing gum composition, preferably from about 5 to about 15%, and optimally from about 8 to about 12%.

Furthermore, any of the water-soluble artificial or natural sweeteners set out hereinbefore may be present together with the particulate poorly extractable sweetener. In each of the preferred embodiments of the chewing gum and method of the invention, corn syrup will be employed as the plasticizer. However, satisfactory results may be obtained, for example, by employing sorbitol syrups, modified starches and the like, without the use of and presence of corn syrup in the chewing gum.

Generally, in forming a preferred embodiment of the chewing gum of the invention, the poorly or slowly extractable (poorly water-soluble) saccharin will be employed in a weight ratio to the easily extractable (water-soluble) sweetener within the range of from about 0.00022:1 to about 20:1 and preferably within the range of from about 0.0011:1 to about 0.025:1.

The following Examples illustrate preferred embodiments of the present invention without, however, limiting the same thereto. All temperatures are expressed in ° F.

EXAMPLE 1

Paraffin, 2g, (melting point 50–52°) is dissolved in 50 ml of chloroform. Free saccharin (5 g) is added to the paraffin solution and homogenized. The mixture is transferred to a 250 ml round bottom flask and vacuum dried on a rotary evaporator at 50°. Alternatively, the homogenate is spray dried. This procedure coats the free saccharin acid particles with the paraffin. The paraffin coated free saccharin acid is ground to a fine powder.

EXAMPLE 2

A long-lasting peppermint flavor chewing gum is prepared from the following ingredients:

|  | Parts by Weight of Chewing Gum |
| --- | --- |
| Chalk containing gum base (contains 18% CaCO$_3$) | 22 |
| Corn syrup, 44° Be' | 17 |
| Coated powdered free saccharin acid (prepared as described in Example 1 and pulverized to pass through a U.S. 140 mesh screen) | 0.2 |
| Powdered sugar (sucrose) | 49 |
| Sorbitol | 10 |
| Ester gum | 0.2 |
| Peppermint oil | 0.8 |
| Peppermint (spray-dried) | 1 |
| Lecithin | 0.2 |

The gum base is melted (temperature 270°), cooled to 180° and placed in a standard dough mixer kettle equipped with sigma blades. The corn syrup and lecithin are added and mixed for 2 minutes at 200°. Flavor oil is then added and incorporated into the base. At the time the mix is folding well, powdered coated free saccharin is added and the mixture is mixed another 2 minutes at 200°. Thereafter, about one half of the sucrose is added and the mixture is mixed for 2 minutes. The sorbitol and remaining sucrose are added, mixed for 1 minute and then spray dried flavor is added and the mixture is mixed for 1 minute. The gum is then discharged from the kettle, cut into 25 lb. loaves and allowed to cool to 90°–120° F. It is then rolled to a thickness of 0.178 cm on a standard Gimpel machine and scored into strips 7.26 cm wide and 41.9 cm long, and cooled for 12–18 hours.

The chewing gum product obtained is found to have a pleasant sweet taste for up to 60 minutes and more without the bitter after-taste normally associated with free saccharin acid. In addition, the chewing gum has a shelf life of 3–6 months.

EXAMPLE 3

Paraffin coated free saccharin acid (7 g) (prepared as in Example 1) is added to 250 ml of a 2% aqueous solution of sodium alginate containing 0.01% of Tween 60 and the mixture is homogenized at a temperature of 50°. The alginate is precipitated as the calcium salt by slowly adding 100 ml of a 2% CaCl$_2$ solution while stirring. The precipitate is separated by filtration (centrifugation may also be used) and vacuum dried at 60°. The so-coated free saccharin acid is ground to a fine powder.

EXAMPLE 4

A long-lasting peppermint flavored chewing gum is prepared from the following ingredients in a manner similar to that described in Example 2.

|  | Parts by Weight of Chewing Gum |
|---|---|
| Chalk-containing gum base (as disclosed in Example 2 - contains 18% CaCo₃) | 22 |
| Coated powdered free saccharin acid (140 mesh) (prepared as described in Examples 1 and 3) | 0.2 |
| Powdered sugar (sucrose) | 67 |
| Modified food starch | 1 |
| Sorbitol syrup | 9 |
| Lecithin | 0.2 |
| Peppermint oil | 0.7 |
| Ester gum | 0.3 |

The above composition is similar to the composition of Example 2 except that it does not include corn syrup but instead includes modified food starch.

EXAMPLE 5

Gelatin, 10 g, is dissolved in 100 ml distilled water at 50° C. Free-cyclamic acid, 10 g, is uniformly suspended in the gelatin solution and freeze or spray dried. The dry material is ground to a fine powder and suspended uniformly in a 100 ml 10% solution of ethyl cellulose in ethanol. The solution is spray dried at 50° C.

EXAMPLE 6

A long-lasting spearmint flavored chewing gum is prepared from the following ingredients in a manner similar to that described in Example 2.

|  | Parts by Weight of Chewing Gum |
|---|---|
| Chalk-containing gum base (contains 20% CaCO₃) | 22 |
| Corn syrup, 44° Be' | 17 |
| Coated powdered free cyclamic acid (140 mesh) (prepared as described in Example 5) | 0.2 |
| Powdered sugar (sucrose) | 49 |
| Sorbitol | 10 |
| Lecithin | 0.2 |
| Peppermint oil | 0.2 |
| Spearmint oil | 0.6 |
| Ester gum | 0.2 |
| Spearmint (spray-dried) | 0.5 |

EXAMPLE 7

A long-lasting spearmint flavored chewing gum is prepared from the following ingredients in a manner similar to that described in Example 2.

|  | Parts by Weight of Chewing Gum |
|---|---|
| Chalk-containing gum base (contains 22% CaCO₃) | 22 |
| Powdered sugar (sucrose) | 67 |
| Coated powdered free saccharin acid (140 mesh)(prepared as described in Example 3) | 0.2 |
| Sorbitol syrup | 9 |
| Lecithin | 0.2 |
| Peppermint oil | 0.2 |
| Spearmint oil | 0.6 |
| Ester gum |  |
| Spearmint (spray dried) | 0.5 |
| Modified food starch | 1 |

The above composition does not include corn syrup but instead includes modified food starch and includes free saccharin acid instead of free cyclamic acid; otherwise it is similar to the composition of Example 6.

EXAMPLE 8

A long-lasting cherry flavored chewing gum is prepared from the following ingredients:

|  | Parts by Weight of Chewing Gum |
|---|---|
| Chalk-containing gum base (contains 18% CaCO₃) | 22 |
| Corn syrup, 44° Be" | 15 |
| Coated powdered free saccharin acid (prepared as described in Example 1 and pulverized to pass through a U.S. 140 mesh screen) | 0.3 |
| Citric acid | 0.7 |
| Fumaric acid | 2 |
| Powdered sugar (sucrose) | 46 |
| Sorbitol | 10 |
| Ester gum | 0.2 |
| Cherry oil | 0.8 |
| Cherry (spray-dried) | 2 |
| Lecithin | 0.2 |

The gum base is melted (temperature 270°), cooled to 180°, and placed in a standard dough mixer kettle equipped with sigma blades. The corn syrup and lecithin are added and mixed for 2 minutes at 200°. Flavor oil is then added and incorporated into the base. At the time the mix is folding well, coated powdered free saccharin and fumaric acid are added and the mixture is mixed another 2 minutes at 200°. Thereafter, about one-half of the sucrose is added, and the mixture is mixed for 1¼ minutes. The sorbitol and remaining sucrose are added, mixed for 1 minute and then citric acid and spray dried flavor are added and the mixture is mixed for 1 minute. The gum is then discharged from the kettle, cut into 25 lb. loaves and allowed to cool to 90°–120° F. It is then rolled to a thickness of 0.178 cm on a standard Gimpel machine and scored into strips 7.26 cm wide and 41.9 cm long, and cooled for 12–18 hours.

The chewing gum product obtained is found to have a pleasant sweet taste for up to 60 minutes and more without the bitter after-taste normally associated with free saccharin acid. In addition, the chewing gum has a shelf life of 3–6 months.

EXAMPLE 9

Ethyl cellulose, 20 g, is dissolved in 200 ml of ethanol and transferred into a resin kettle equipped with stirrer, vacuum line, thermometer and heating mantle. Fumaric acid, 20 g, as a fine powder, is added to the kettle. The contents of the kettle are stirred under a vacuum of 25 inches of Hg. After a few minutes the kettle is heated to 50° with contained stirring until the solution becomes very viscous and all of the ethanol is evaporated. The so-called fumaric acid is removed from the kettle, and ground to a fine powder.

EXAMPLE 10

A long-lasting cherry flavored chewing gum is prepared from the following ingredients in a manner similar to that described in Example 8.

|  | Parts by Weight of Chewing Gum |
|---|---|
| Chalk-containing gum base (contains 18% CaCO₃) | 22 |

| | Parts by Weight of Chewing Gum |
|---|---|
| (140 mesh)(prepared as described in Example 5) | 0.2 |
| Powdered sugar (sucrose) | 62 |
| Modified food starch | 1 |
| Sorbitol syrup | 9 |
| Citric acid | 0.8 |
| Coated fumaric acid (prepared as described in Example 9) | 2 |
| Lecithin | 0.2 |
| Cherry oil | 0.8 |
| Ester gum | 0.2 |
| Cherry (spray dried) | 2 |

The above composition includes modified food starch instead of corn syrup and coated fumaric acid, but otherwise is similar to the composition of Example 8.

EXAMPLE 11

Chalk particles are coated with ethyl cellulose in accordance with the following procedure.

Ethyl cellulose, 20 g, is dissolved in 200 ml of ethanol and transferred into a kettle equipped with stirrer, vacuum line, thermometer and heating mantle. To this solution, 80 g of calcium carbonate are added and thoroughly mixed to effect a homogeneous suspension. The ethanol is evaporated while stirring is continued. The material is transferred into a fluidized-bed drier and hot air is passed to remove the residual ethanol from the coated calcium carbonate.

The so-coated chalk particles are mixed with conventional base ingredients to form a gum base containing 18% calcium carbonate.

EXAMPLE 12

A long-lasting peppermint chewing gum is prepared from the following ingredients in a manner similar to that described in Example 2.

| | Parts by Weight of Chewing Gum |
|---|---|
| Coated chalk containing gum base (contains 18% CaCO$_3$ prepared as described in Example 11) | 25 |
| Powdered free saccharin (140 mesh) | 0.2 |
| Powdered sugar (sucrose) | 49 |
| Corn Syrup, 44° Be' | 17 |
| Sorbitol | 10 |
| Ester gum | 0.2 |
| Peppermint oil | 0.8 |
| Peppermint oil | 0.8 |
| Peppermint (spray-dried) | 1 |
| Lecithin | 0.2 |

The chewing gum product obtained is found to have a shelf life of 3-6 months and a pleasant sweet taste for up to 60 minutes.

In each of the above examples the paraffin wax, sodium alginate, ethyl cellulose and other coating materials stabilize the poorly soluble acid sweetener and/or poorly soluble food acid by protecting it from coming in contact with chalk thereby inhibiting formation of the soluble sweetener salts or soluble food acid salts and increasing shelf life of the chewing gum.

What is claimed is:

1. A flavored chewing gum having a prolonged sweet taste comprising chalk-containing gum base, and from about 0.02 to about 2.5% by weight of a particulate slowly extractable or poorly water-soluble sweetener coated with an edible coating agent dispersed in said chalk containing gum base, said particulate poorly water-soluble sweetener comprising free saccharin acid or free cyclamic acid.

2. The flavored chewing gum according to claim 1 wherein said coating agent is present in a weight ratio to said sweetener of within the range of from about 10:1 to about 0.1:1.

3. The flavored chewing gum according to claim 1 wherein said coating agent is a hydrophilic colloid.

4. The flavored chewing gum according to claim 3 wherein the edible hydrophilic colloid is ethyl cellulose, paraffin wax, or sodium alginate.

5. The flavored chewing gum according to claim 1 wherein the edible coating agent is a water insoluble wax, pectin, carrageenin or arabic acid.

6. The flavored chewing gum as defined in claim 1 wherein said particulate poorly water-soluble sweetener has an average particle size below about 150 microns.

7. The flavored chewing gum as defined in claim 1 wherein said particulate poorly water-soluble sweetener comprises free saccharin acid.

8. The flavored chewing gum as defined in claim 1 wherein said poorly water-soluble sweetener comprises free cyclamic acid.

9. A flavored chewing gum having a prolonged sweet taste comprising a gum base containing from about 5 to about 50% by weight calcium carbonate coated with an edible coating agent, and a poorly water-soluble sweetener dispersed in said gum base, said sweetener comprising free saccharin acid or free cyclamic acid.

10. The chewing gum as defined in claim 9 wherein said sweetener comprises free saccharin acid.

11. The chewing gum as defined in claim 10 wherein said free saccharin acid is coated with an edible coating agent.

12. The chewing gum as defined in claim 9 wherein said sweetener comprises free cyclamic acid.

13. The chewing gum as defined in claim 12 wherein said free cyclamic acid is coated with an edible coating agent.

14. The chewing gum as defined in claim 9 further including a poorly water-soluble food acid selected from the group consisting of fumaric acid, adipic acid and succinic acid.

15. The chewing gum as defined in claim 14 wherein said food acid is coated with an edible coating agent.

* * * * *

UNITED STATES PATENT OFFICE
CERTIFICATE OF CORRECTION

Patent No. 4,065,579　　　　　　　　　　Dated December 27, 1977

Inventor(s) Donald A. M. Mackay

It is certified that error appears in the above-identified patent and that said Letters Patent are hereby corrected as shown below:

Column 2, line 50, "firt" should read --first--.
Column 11, in the first table, before "(140 mesh)(prepared as described in Example 5)" insert --Coated powdered free saccharin acid--.
Column 11, Example 12, in the table, delete "Peppermint oil   0.8" second occurrence.

Signed and Sealed this

Sixteenth Day of May 1978

[SEAL]

Attest:

RUTH C. MASON　　　　　　　LUTRELLE F. PARKER
Attesting Officer　　　　Acting Commissioner of Patents and Trademarks